United States Patent [19]

Grewe et al.

[11] Patent Number: 5,938,365
[45] Date of Patent: Aug. 17, 1999

[54] TUBULAR FRAME WITH ROUND CORNER MEMBERS

[76] Inventors: Ronald E. Grewe, 22437 Cranbrooke Dr., Novi, Mich. 48375; David J. Muir, 6042 Cheryl Ct., West Bloomfield, Mich. 48324

[21] Appl. No.: 08/823,341

[22] Filed: Mar. 24, 1997

[51] Int. Cl.[6] .............................. F16B 7/00; G09F 7/02
[52] U.S. Cl. .................... 403/231; 403/205; 403/403; 403/383; 40/778; 40/782
[58] Field of Search ..................... 403/205, 401, 403/402, 403, 231, 383, 295; 160/381, 377; 40/778, 782; 224/148

[56] References Cited

U.S. PATENT DOCUMENTS

| | | | |
|---|---|---|---|
| 3,736,035 | 5/1973 | Brown et al. | 312/107 |
| 3,782,054 | 1/1974 | Goss, Jr. | 403/295 |
| 3,932,048 | 1/1976 | DuPont | 403/295 |
| 4,027,987 | 6/1977 | Berkowitz | 403/295 X |
| 4,636,105 | 1/1987 | Johansson . | |
| 4,673,308 | 6/1987 | Reilly | 403/295 |
| 4,746,042 | 5/1988 | King | 224/148 |
| 4,770,560 | 9/1988 | Ott | 403/296 |
| 4,938,731 | 7/1990 | Nguyen et al. | 403/359 |
| 4,977,696 | 12/1990 | Johansson . | |
| 5,148,718 | 9/1992 | Kakuguchi et al. | 403/383 |
| 5,600,914 | 2/1997 | Tatar | 403/383 |
| 5,617,660 | 4/1997 | Pollack | 40/782 X |
| 5,732,496 | 3/1998 | Tanaka | 403/403 X |

FOREIGN PATENT DOCUMENTS 354239   3/1961   Switzerland ........................ 403/205

*Primary Examiner*—Lynne Reichard
*Assistant Examiner*—John R. Cottingham

[57] ABSTRACT

A tubular frame having a plurality of tubular members and a backing member. The tubular members are held together by round corner members. The corner members have hollow tubular insertion members or legs at one end and "X" or "cross-shaped" insertion members or legs at the other end in order to mate with adjacent tubular frame members. The two insertion members are adapted to be joined to a tubular member in only certain orientations which assists in manufacturing and assembly. The tubular frame members also have elongated channels on one side for mating with the backing member.

18 Claims, 3 Drawing Sheets

TUBULAR FRAME WITH ROUND CORNER MEMBERS

TECHNICAL FIELD

The present invention relates to tubular frame devices with backing members and round corner members.

BACKGROUND OF THE INVENTION

There are a number of tubular devices known today, in which various shapes and configurations of tubular members are connected together in various configurations to form various structures. These structures include furniture, storage devices, boxes, and frame members. The tubular structures are made from various lengths and sizes of tubular members and have corner or connector members which hold the tubular members together. The corner/connector members (or pieces) can have one, two, three or more legs for inserting into the tubular members and holding them in various configurations. For example, square tubular devices are shown in U.S. Pat. No. 4,368,998. Other tubular devices are shown in U.S. Pat. Nos. 4,636,105 and 4,977,696.

Where the tubular members and corner pieces are used for frames intended for display or advertising purposes, they are generally used in businesses and other places of sale to give information about goods, prices, news, etc. The frames may be placed on a counter with the aid of a base of some type, mounted on a wall or other surface, or suspended by wires or similar devices.

It is an object of the present invention to provide an improved tubular frame device with round corner members. It is another object of the present invention to provide such devices which are sturdy and durable.

It is a further object of the present invention to provide an aesthetic, well-constructed tubular display device which is relatively simple and economical to manufacture. It is still another object of the present invention to provide such devices in which the corner devices are designed to accommodate assembly of the devices in only certain predetermined manners.

It is a still additional object of the present invention to provide a tubular frame device which has frame members which are economical to manufacture and corner pieces made of a plastic material which are also inexpensive and economical to manufacture.

SUMMARY OF THE INVENTION

The above-noted objects are met by the present invention. The present invention provides an improved tubular display device which has a plurality of tubular members connected together by round molded corner members. The tubular members are preferably made of metal, such as an aluminum extruded material. The inner surfaces of the tubular members are profiled with one or more recesses or grooves in order to mate with corresponding structures on the corner members. A pair of adjacent flange members may be provided along one side of the tubular members in order to mate with and be secured to a backing member. The flange members form an elongated channel in which an elongated edge of the backing member is positioned.

The corner members are preferably made from a hard, durable plastic material, such as nylon. Each of the corner members has a 90-degree curved body member and a pair of elongated insertion members or legs. One or both of the insertion or leg members can have a hollow tubular structure with one or more flat portions and one or more raised ridges on the outer periphery for mating with corresponding flat portions and grooves inside the tubular members.

One or both of the leg or insertion member also can have an "X" or cross-shape, preferably with four arms. A recess or groove is positioned in one of the arms in order to assist in securing the corner piece to the adjacent tubular member with a fastener. Another arm has an enlarged end and is adapted to mate with a corresponding groove in the adjacent tubular member.

The corner members also have a flange on the inside curved surface and an adjacent aligned slot or opening. The flange and/or slot mate with a corner of the frame backing member.

The complementary mating insertion members and tubular members allow ease of assembly of the corner members and tubular members into a tubular frame device. In addition, the mating grooves and ridge members are arranged to only allow assembly of the corner members with the tubular members in a manner which aligns the flange and slot with the elongated channel formed by the flange members on the tubular members. The configuration of the ends or leg members in cooperation with the mating tubular members also prevents the corner members from rotating after they are inserted. The mating configurations of corner members and tubular members further prevents obvious incorrect or improper assembly. These factors assist in faster and proper assembly of the tubular frame devices.

The tubular frame devices can be used for any advertising or promotional purpose. For example, they can be mounted on a counter, on a wall surface, or suspended from a ceiling or other structure. In addition, the tubular frame devices can be attached to a base member having one or more resilient members, such as coil springs, which allows the final product to be essentially wind-resistant.

These and other features and benefits of the present invention will become apparent from the following description of the invention when taken in view of the attached drawings and appended claims.

BEST MODE(S) FOR CARRYING OUT THE INVENTION

Figure 1:
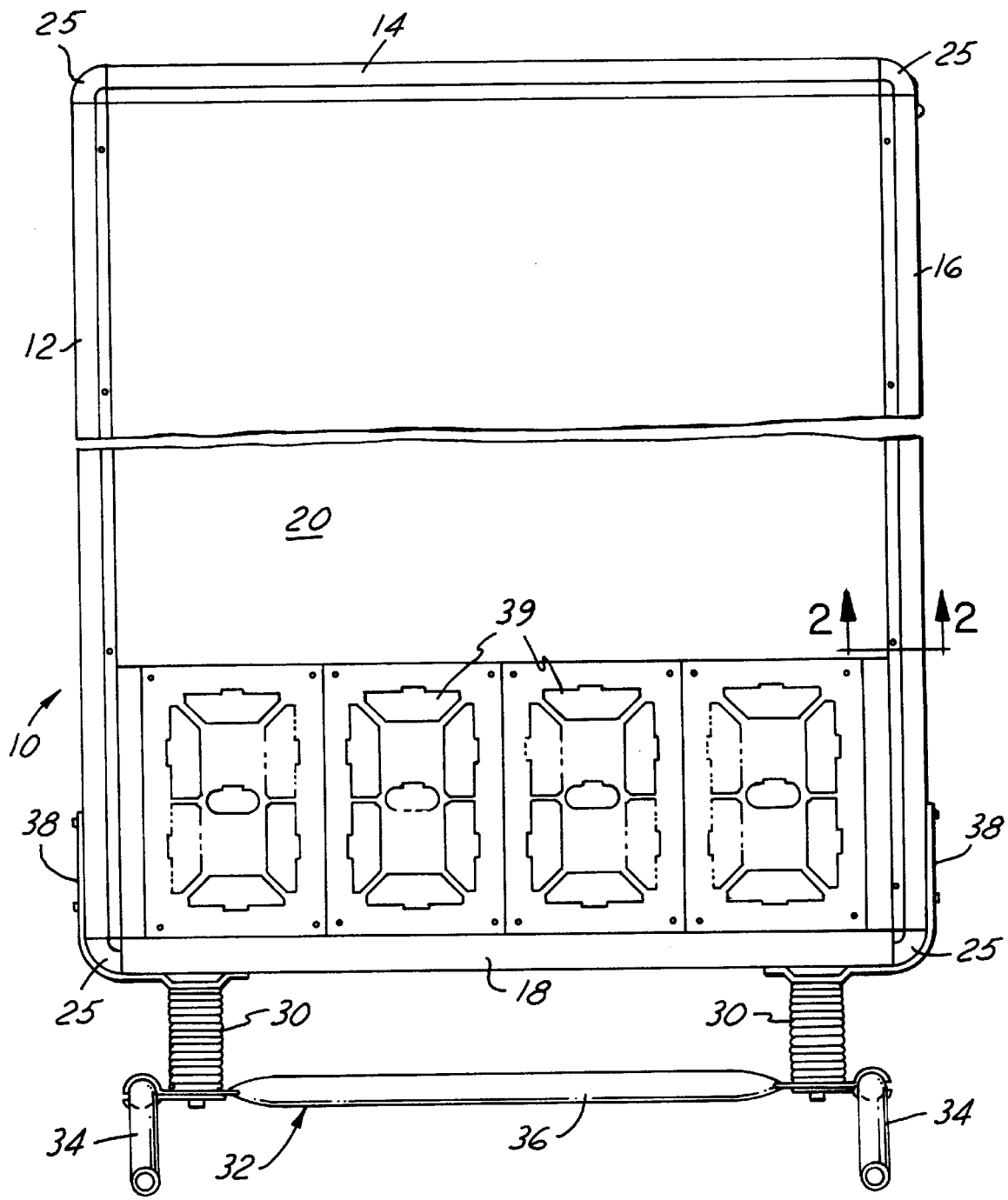
FIG. 1 illustrates one preferred embodiment of the present invention.

The present inventive tubular frame device is shown in FIG. 1 and generally referred to by the reference numeral 10. The frame device includes four tubular frame members 12, 14, 16 and 18, a backing plate or backing member 20, and four round corner members 25. For ease of manufacture and assembly, each of the corner members preferably has the same cross-sectional shape and configuration, although it is possible to utilize several different corner members.

The present inventive tubular frame device has a plurality of different uses and is particularly useful for advertising and promotional purposes. The frame device 10 can be positioned on a counter, mounted on a wall, suspended from a ceiling or the like, or mounted in any other conventional manner. In the embodiment shown in FIG. 1, the tubular frame device 10 is depicted mounted on a pair of coil springs 30 and a base member 32. The base has a pair of ground engaging elongated legs 34, a cross-member 36, and a pair of bracket members 38 which are used to connect the base member 32 and coil springs 30 to the tubular frame members. The coil springs 30 allow the tubular frame device 10 to bend and deflect in windy conditions when the sign is placed in an outdoor environment. Advertising frame devices of this type are generally used in businesses and other places of sale to give information about goods, prices, news, etc. In this regard, as shown in FIG. 1, the frame device 10 can include a plurality of digital-type numbers 39 to provide pricing information to the public.

Figure 2:
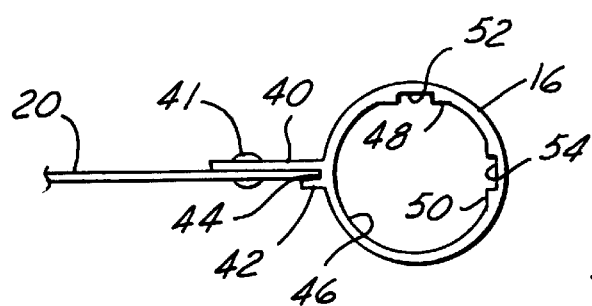
FIG. 2 is a cross-sectional view of a portion of the device shown in FIG. 1, the cross-section being taken along lines 2—2 in FIG. 1 and in the direction of the arrows.

The tubular frame members 12, 14, 16 and 18 preferably are extruded tubular aluminum members having the cross-sectional size and shape as shown in FIG. 2. The aluminum tubular members are lightweight and durable and provide an aesthetic assembled frame. Preferably, the tubular members on each of the four or more sides of the frame device 10 have a similar cross-sectional size and shape in order to aid in manufacturing and assembly.

A preferred cross-sectional size and shape of the tubular members is shown in FIG. 2. Each of the tubular members, such as representative member 16, has a pair of elongated flange members 40 and 42 along one side. The tubular member 16 preferably has an outer diameter of approximately 1 inch and a wall thickness of approximately 0.050 inches. Flange members 40 and 42 are positioned adjacent each other and form a channel 44 for insertion of an edge of the backing member 20. In this regard, the backing member is preferably a thin sheet of aluminum or similar material. The backing member is attached to the flange member 40 by any conventional means 41, such as fasteners, pop-rivets, "button clinch" attachments, or the like. Also, flange member 42 is angled slightly from flange member 40 in order to allow greater ease of entry of the edge of backing member 20 into channel 44.

It is also possible to utilize tubular members without flanges, and instead crimp or bend the outer edges of the backing member and fasten the bent edges with pop rivets or other fasteners to the tubular members. Also, if flanges are preferred, the flanges can have equal lengths, or be extruded with a large angle between them and then be crimped or roll-formed to make a smaller V-shape or a pair of parallel flange members.

The inside surface 46 of tubular member 16 preferably has two flat or planar surface portions 48 and 50 and two grooves 52 and 54, one in each of the planar areas 48 and 50. The planar areas and grooves extend the full length of the tubular members and are adapted to mate with corresponding planar areas and ridge members on the round corner members 25, as explained below.

Figure 4:
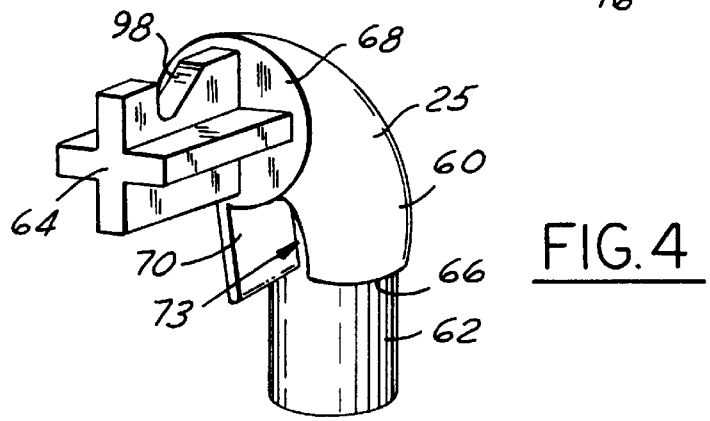
FIG. 4 is a perspective view of one of the inventive round corner members.
Figure 10:
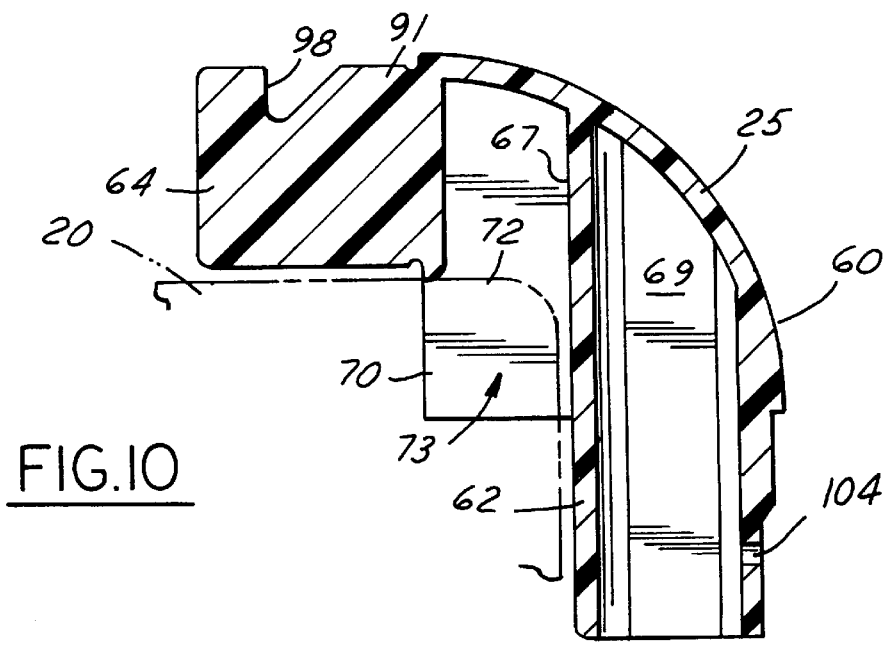
FIG. 10 is a cross-sectional view of the round corner device as shown in FIG. 6, the cross-section being taken along line 10—10 in FIG. 6 and in the direction of the arrows.
Figure 7:
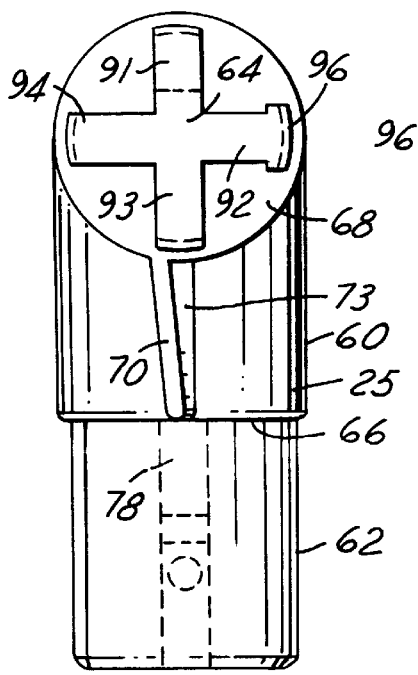
FIG. 7 is an end elevational view of a round corner member in accordance with the present invention.
Figure 5:
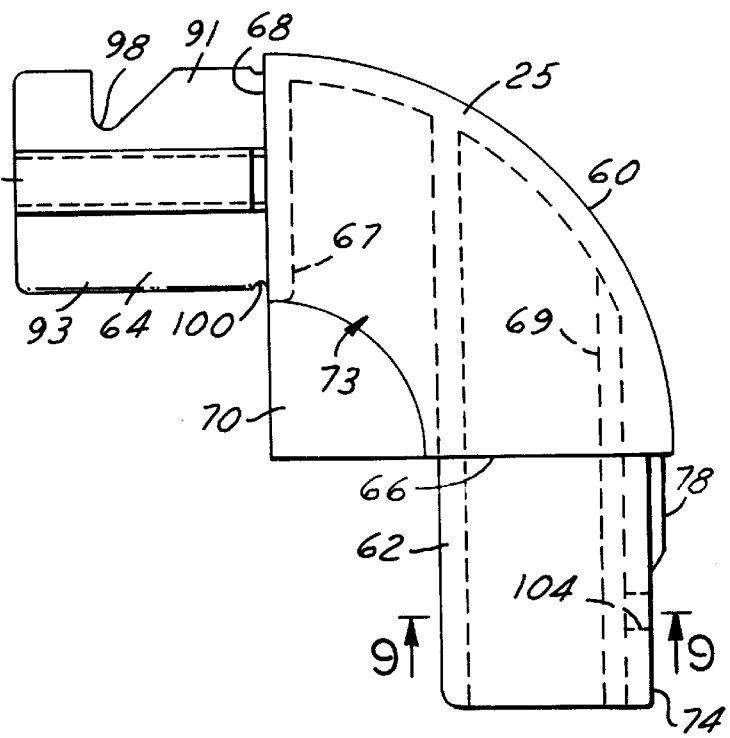
FIG. 5 is a side elevational view of a round corner member in accordance with the present invention.
Figure 6:
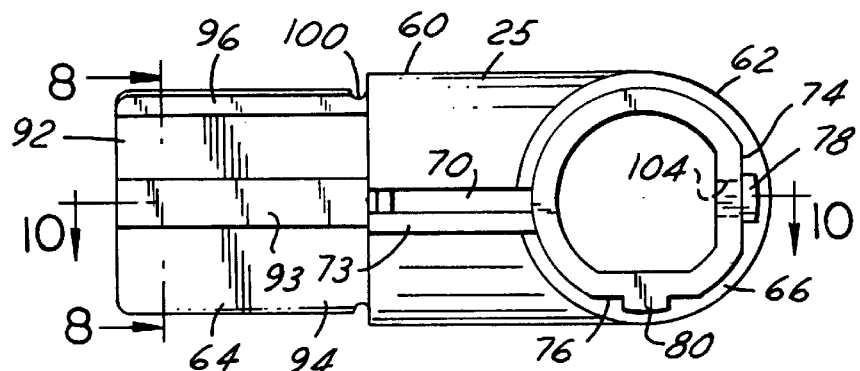
FIG. 6 is a bottom elevational view of a round corner member in accordance with the present invention.
Figure 8:
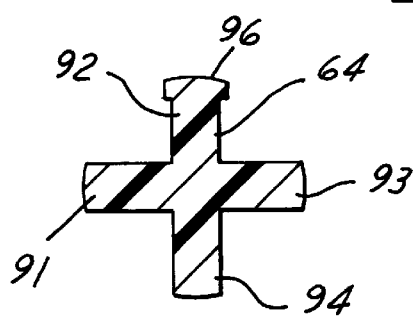
FIG. 8 is a cross-sectional view of the round corner member of FIG. 6, the cross-section being taken along line 8—8 in FIG. 6 and in the direction of the arrows.
Figure 9:
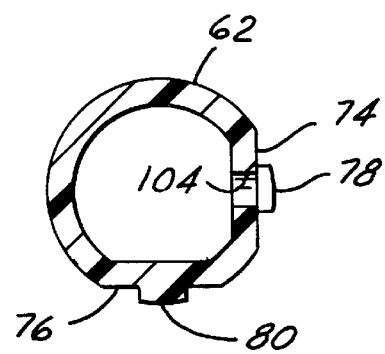
FIG. 9 is a cross-sectional view of the round corner device as shown in FIG. 7, the cross-section being taken along line 9—9 in FIG. 7 and in the direction of the arrows.

The preferred round corner member 25 utilized in accordance with the present invention is shown in a perspective view in FIG. 4, and in elevational and cross-sectional views in FIGS. 5–10. Preferably, the corner members 25 are made from a molded hard, durable plastic material, such as nylon or an equivalent material. Also, the corner members 25 are preferably provided in the cross-sectional size and configuration shown in FIGS. 4–10.

Each of the corner members 25 includes a 90-degree curved body member 60, a hollow insertion or leg member 62, and a "cross-shaped" insertion or leg member 64. The body portion 60 has annular shoulder members 66 and 68 on its two ends adjacent the two insertion members. The two annular shoulder members 66 and 68 are positioned 90-degrees from one another and are adapted to abut with the ends of adjacent tubular corner members.

The body member 25 is preferably molded as a hollow structure which provide economies in weight and cost. Hollow chambers 67 and 69 are shown, for example, in FIGS. 5 and 10.

Figure 3:
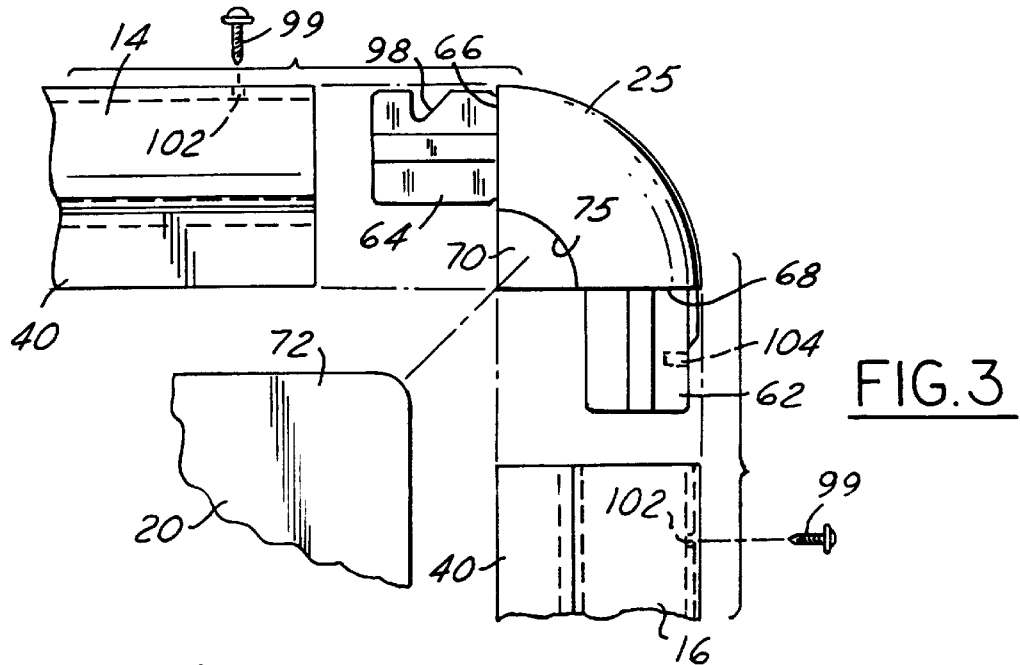
FIG. 3 is an exploded view of one of the corners of the tubular frame device as shown in FIG. 1.

The body portion 60 also has a small flange 70 on the inner curved surface. The flange 70 overlaps corners 72 of the backing member 20 (as shown in FIG. 3). Slot 73 in body portion 60 provides for insertion of the corners 72 of the backing member in order to allow assembly of the tubular frame around the backing member. Alternatively, the corners of the backing member could be rounded to match the inside curved surfaces 75 of the body members 25, or the corners of the backing member should be cut-out to match the profile of the flanges 70.

Insertion or leg member 62 is preferably formed as an elongated hollow tubular member and has a pair of flat or planar surfaces 74 and 76 and a pair of raised ridge members 78 and 80. The planar surfaces 74 and 76, together with ridge members 78 and 80, are adapted to mate with the corresponding planar portions 48 and 50, respectively, and corresponding grooves 52 and 54, respectively, in the tubular members 14, 16, 18, and 20. Due to the presence of the planar areas and mating grooves and ridges, it is possible to assemble insertion or leg members 62 in the open end of the adjacent tubular member in only one orientation which aligns flange 70 and slot 73 with channel 44. This ensures that the tubular frame devices 10 are always assembled in a proper manner, and saves labor, time and expense.

Also, although two sets of mating planar areas and two mating groove and ridge configurations are shown, it is also possible to provide only one set of mating planar areas and/or one mating groove and ridge member. In addition, it would be obvious to persons of ordinary skill in the art to provide other types of mating structures and configurations which would accomplish the same purpose, such as V grooves, and other non-round mating surfaces. Further, it is possible to provide the ridge member in the tubular members and the mating groove members on the corner members.

Insertion or leg members 64 are preferably formed in an "X" or a "cross-shaped" configuration as shown in the drawings. Four elongated arms 91, 92, 93 and 94 form a cross-shaped configuration. Preferably, one or more of the arms, such as arm 92, has an enlarged end member 96 at its outer end. The enlarged end member 96 is adapted to mate with one of the grooves 50 or 54 in the adjacent tubular member. This provides a secure mating relationship between the round corner member and the adjacent tubular member. One of the cross members 91 also contains a V-shaped groove or recess 98 therein. This recess allows a fastening device 99, such as a screw or pop rivet, etc., to be inserted through the adjacent tubular member and into the groove 98 in order to more securely hold the round corner members 25 to their adjacent tubular members until the backing member is secured in place. In this regard, although it is shown that the groove 98 is only positioned in one of the cross-shaped structure arms, it is possible to provide grooves in two or more of the arms, or two or more grooves in a single arm. This would allow added flexibility relative to securing the tubular members to adjacent corner members.

Annular groove 100 is also provided at the ends of the arms 91–94 where they mate with annular flat surface 68 on the body portion 60 of the round corner device 25. Groove 100 is provided to reduce stresses in the corner member and prevent possible fracture at that point. Groove 100 also can be used to accumulate any plastic material which might be scraped from the corner member when it is being inserted into the tubular member.

As indicated above, the preferred construction of the round corner members 25, together with the structure and configuration of the tubular members which are used on the frame, allows assembly of the various frame members in an easier and predetermined manner. The configuration of the members also prevents unobvious incorrect assembly and prevents rotation of one member relative to the other. This decreases assembly cost and complexity. Also, by providing all of the tubular members of the same type and internal cross-section, and providing all of the corner members of the same shape and configuration, this reduces manufacturing cost, reduces inventory costs, and reduces choices and complexities in the assembly of the final product.

Although the preferred embodiment of the invention utilizes a tubular leg member at one end of the round corner member and a cross-shaped leg member at the other end, it is within the scope of the invention to provide tubular leg members at both ends, or provide cross-shaped leg members at both ends. In addition, other cross-sectional sizes and shapes of the leg members could be provided so long as the principal objects, purposes and advantages of the present invention are met.

When the tubular frame device 10 is assembled, three sides of the device are first assembled. Three tubular members are mated with two round corner members and they are held in position such as with fastening devices 99 (see FIG. 3). For this purpose, appropriate holes or openings 102 are provided adjacent the ends of each of the tubular members, and a mating opening or hole 104 is also provided in leg member 62. One of the openings 102 is aligned with recess 98 and another of the openings 102 is aligned with opening 104. Fasteners, such as screws 99, pop rivets, or the like are used to hold the tubular members in the corner members.

Subsequently, the backing member 20 is slid into channels 44 in the three joined tubular members and the remainder of the frame device 10 is completed. Securing the backing member to two or more of the flange members 40 with fasteners 41 permanently hold the frame device 10 together in its final shape. Thereafter, if desired, fasteners 99 can be removed and the holes or openings 102 filled or left empty.

Although the use of fasteners, such as screws 99 or pop rivets, is disclosed to hold the tubular members and corner members together until the backing member is secured in place and the final frame device is assembled, it is understood that other means could be used to hold the tubular members and corner members together for this purpose. For example, the following could be utilized: a jig or clamping mechanism, tape or glue, or a simple detent (dimple) formed in the tubular members in place of the openings 102. It is also possible to dispense with the use of fasteners 99 altogether in assembly of the tubular frame, particularly with smaller sized frames.

While the best modes for carrying out the invention have been described in detail, those familiar with the art to which this invention relates will recognize various alternative designs and embodiments for practicing the invention as defined by the following claims.

What is claimed is:

1. A tubular frame device, comprising:

a plurality of elongated hollow tubular members arranged to form said frame device; and a plurality of corner members connecting said tubular members together, one of said corner members being positioned between a pair of said adjacent tubular members;

at least one of said corner members comprising a body portion and a pair of opposed leg members, one of said leg members having a cross-shaped configuration and adapted to be inserted into a first tubular member, and the other of said leg members having a tubular configuration and adapted to be inserted into a second tubular member;

said other of said leg members having two planar portions on its external surface, said planer portions being positioned 90° apart;

said other of said leg members having a ridge member on each of said planer portions;

at least one of said tubular members having two corresponding planer portions on the internal surface thereof, each of said corresponding planer portions having a groove thereon;

wherein when said at least one corner member is assembled with said at least one of said tubular members, and ridge members and groove members mate together.

2. The tubular frame device as set forth in claim 1 further comprising a backing member.

3. The tubular frame device as set forth in claim 2 further comprising elongated channel means on said tubular members, said channel means adapted to join said backing member to said tubular members.

4. The tubular frame device as set forth in claim 3 wherein said channel means comprises a pair of elongated flange members.

5. The tubular frame device as set forth in claim 4 wherein one of said flange members is angled to provide ease of entry of said backing member into said channel means.

6. The tubular frame device as set forth in claim 1 further comprising a pair of closely spaced flange members on at least two of said tubular members.

7. The tubular frame device as set forth in claim 1 wherein said body member is curved and said opposed leg members are positioned approximately 90° to one another.

8. The tubular frame device as set forth in claim 1 further comprising a flange member on said body member.

9. A round corner member for a tubular frame, said corner member comprising:

a body member;

a first leg member attached to said body member and having a cross-shaped configuration; and a second leg member attached to said body member and having a hollow tubular configuration;

said second leg member having an external surface with two planar portions thereon, said planar portions being spaced 90° apart;

each of said planar portions having a ridge member thereon.

10. The round corner member as set forth in claim 9 wherein said cross-shaped configuration has a plurality of arm members and at least one of said arm members has an enlarged end member thereon.

11. The round corner member as set forth in claim 9 wherein said body member is curved and said opposed leg members are positioned approximately 90° to one another.

12. The round corner member as set forth in claim 9 further comprising a flange member on said body member.

13. A tubular frame device, comprising:

a plurality of elongated hollow tubular members arranged to form said frame device; and a plurality of L-shaped corner members connecting said tubular members together, one of said corner members being positioned between a pair of said adjacent tubular members;

each of said corner members comprising a body portion, a first leg member and an opposed second leg member, said first leg member having a cross-shaped configuration and adapted to be inserted into a first tubular member, and said second leg member having a tubular configuration and adapted to be inserted into a second tubular member;

said cross-shaped configuration having a plurality of arm members, at least one of said arm members having an elongated ridge along the length thereof;

said second leg member having two planar portions on the external surface thereof, said planar portions being positioned 90° apart;

said second tubular member having two planar portions on the internal surface thereof, said planar portions being positioned 90° apart;

wherein when said second leg member is inserted into said second tubular member, said planar portions mate with one another.

14. The tubular frame device as set forth in claim 13 wherein said first tubular member has an internal surface thereon, said internal surface having a groove member therein for mating with said elongated ridge.

15. A tubular frame device comprising:

a plurality of elongated hollow tubular members arranged to form said frame device; and a plurality of L-shaped corner members connecting said tubular members together, one of said corner members being positioned between a pair of said adjacent tubular members;

said corner members each comprising a body portion, a first leg member and an opposed second leg member, said first leg member having a cross-shaped configuration with a plurality of arm members and adapted to be inserted into a first tubular member, and said second leg member having a tubular configuration and adapted to be inserted into a second tubular member;

at least one of said arm members having a recess therein;

said adjacent tubular members each having an internal surface therein, and each of said internal surfaces having a pair of planar portions spaced 90° apart;

each of said planar portions having an elongated groove therein;

wherein when said first leg member is inserted into said first tubular member, a fastening member can be inserted through said first tubular member and into said recess in order to secure said corner member to said first tubular member.

16. A tubular frame device, comprising:

a plurality of elongated hollow round tubular members arranged to form said frame device; and a plurality of L-shaped corner members connecting said round tubular members together, one of said corner members being positioned between a pair of said adjacent round tubular members;

each of said corner members comprising a round body portion, a first leg member and an opposed second leg member, said first leg member having a cross-shaped configuration and adapted to be inserted into a first round tubular member, and said second leg member having a round tubular configuration and adapted to be inserted into a second round tubular member;

said cross-shaped configuration having a plurality of arm members, at least one of said arm members having an elongated ridge along the length thereof;

said second leg member having two planar portions on the round external surface thereof, said planar portions being positioned 90° apart;

said second tubular member having two planar portions on the round internal surface thereof, said planar portions being positioned 90° apart;

wherein when said second leg member is inserted into said second tubular member, said planar portions mate with one another.

17. The tubular frame device as set forth in claim 16 wherein said first tubular member has an internal surface thereon, said internal surface having a groove member therein for mating with said elongated ridge.

18. A tubular frame device comprising:

a plurality of elongated round hollow tubular members arranged to form said frame device; and a plurality of L-shaped corner members connecting said tubular members together, one of said corner members being positioned between a pair of said adjacent tubular members;

said corner members each comprising a round body portion, a first leg member and an opposed second leg member, said first leg member having a cross-shaped configuration with a plurality of arm members and adapted to be inserted into a first tubular member, and said second leg member having a round tubular configuration and adapted to be inserted into a second tubular member;

at least one of said arm members having a recess therein transverse to the longitudinal direction of said arm member;

said adjacent tubular members each having an internal surface therein, and each of said internal surfaces having a pair of planar portions spaced 90° apart;

each of said planar portions having an elongated groove therein;

wherein when said first leg member is inserted into said first tubular member, a fastening member can be inserted through said first tubular member and into said recess in order to secure said corner member to said first tubular member.

* * * * *